(12) United States Patent
Fukuoka et al.

(10) Patent No.: US 11,137,965 B2
(45) Date of Patent: Oct. 5, 2021

(54) INFORMATION PROCESSING APPARATUS FOR CONTROLLING TRANSMISSION OF INFORMATION WHILE VARYING TRANSMISSION INTERVALS

(71) Applicant: FUJIFILM BUSINESS INNOVATION CORP., Tokyo (JP)

(72) Inventors: Takanori Fukuoka, Kanagawa (JP); Kenji Imamura, Kanagawa (JP); Masahiro Kobata, Kanagawa (JP); Shinho Ikeda, Kanagawa (JP); Tokuji Ueda, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 246 days.

(21) Appl. No.: 16/054,221

(22) Filed: Aug. 3, 2018

(65) Prior Publication Data

US 2019/0056899 A1 Feb. 21, 2019

(30) Foreign Application Priority Data

Aug. 17, 2017 (JP) .............................. JP2017-157661

(51) Int. Cl.
*G06F 3/12* (2006.01)
*H04N 1/00* (2006.01)
*G06F 13/38* (2006.01)
*G06F 13/12* (2006.01)

(52) U.S. Cl.
CPC .......... *G06F 3/1279* (2013.01); *G06F 3/1211* (2013.01); *G06F 3/1236* (2013.01); *G06F 13/122* (2013.01); *G06F 13/38* (2013.01); *H04N 1/00915* (2013.01)

(58) Field of Classification Search
None
See application file for complete search history.

(56) References Cited

U.S. PATENT DOCUMENTS

| | | | | |
|---|---|---|---|---|
| 6,944,684 B1 * | 9/2005 | Kinjo | .................... | G06F 3/0613 710/31 |
| 2015/0058507 A1 | 2/2015 | Sengoku et al. | | |

FOREIGN PATENT DOCUMENTS

| | | | | |
|---|---|---|---|---|
| JP | 05342026 A | * | 12/1993 | ........... G06F 3/0665 |
| JP | 2005149082 A | * | 6/2005 | ........... G06F 3/0665 |
| JP | 2016-532967 A | | 10/2016 | |

* cited by examiner

*Primary Examiner* — Thomas D Lee
(74) *Attorney, Agent, or Firm* — Oliff PLC (57) ABSTRACT

An information processing apparatus includes a first controller and a second controller. The first controller performs processing dependent on hardware having a function. The second controller is connected to the first controller via a general-purpose communication path and performs processing not dependent on the hardware. Each of the first controller and the second controller transmits control information used for controlling the hardware to a counterpart controller of the first controller or the second controller via the communication path while varying a transmission interval in accordance with a type of the control information.

18 Claims, 10 Drawing Sheets

INFORMATION PROCESSING APPARATUS FOR CONTROLLING TRANSMISSION OF INFORMATION WHILE VARYING TRANSMISSION INTERVALS

CROSS-REFERENCE TO RELATED APPLICATIONS

This application is based on and claims priority under 35 USC 119 from Japanese Patent Application No. 2017-157661 filed Aug. 17, 2017.

BACKGROUND

Technical Field

The present invention relates to information processing apparatuses.

SUMMARY

According to an aspect of the invention, there is provided an information processing apparatus including a first controller and a second controller. The first controller performs processing dependent on hardware having a function. The second controller is connected to the first controller via a general-purpose communication path and performs processing not dependent on the hardware. Each of the first controller and the second controller transmits control information used for controlling the hardware to a counterpart controller of the first controller or the second controller via the communication path while varying a transmission interval in accordance with a type of the control information.

BRIEF DESCRIPTION OF THE DRAWINGS

An exemplary embodiment of the present invention will be described in detail based on the following figures, wherein.

DETAILED DESCRIPTION

Figure 1:
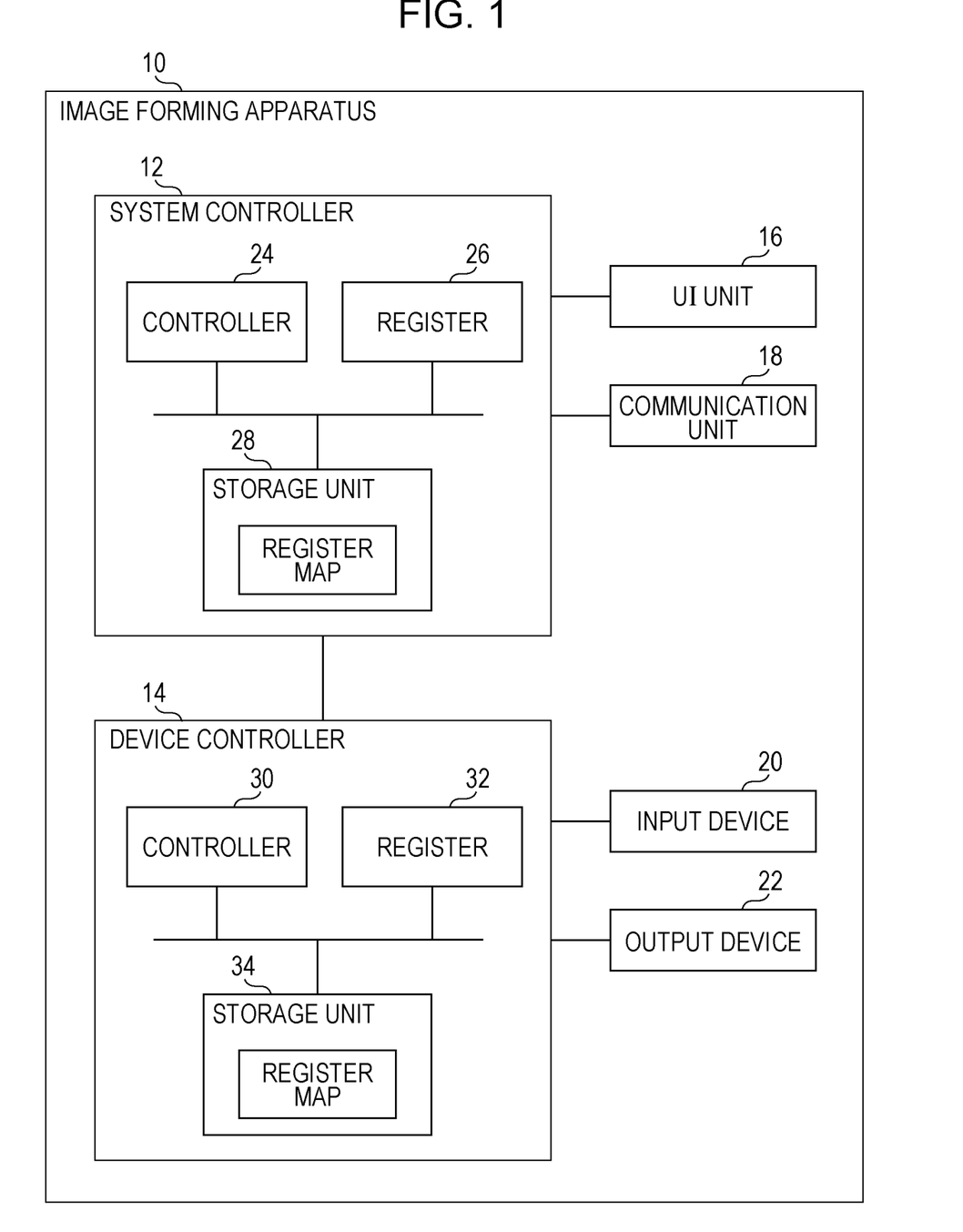
FIG. 1 is a block diagram illustrating an image forming apparatus according to an exemplary embodiment of the present invention.

An image forming apparatus as an example of an information processing apparatus according to an exemplary embodiment will now be described with reference to FIG. 1. FIG. 1 illustrates an example of the image forming apparatus according to this exemplary embodiment. The information processing apparatus according to this exemplary embodiment is not limited to an image forming apparatus and may be an apparatus other than an image forming apparatus, such as a video recorder, an image playback apparatus (including a video playback apparatus and a still-image playback apparatus), an audio playback apparatus (including a music player), or other digital apparatuses. In the following, an image forming apparatus is described as an example of an information processing apparatus.

An image forming apparatus 10 has an image forming function. Specifically, the image forming apparatus 10 has at least one of a scanning function (i.e., an image reading function), a printing function, a copying function, and a facsimile function. The image forming apparatus 10 may also have a function for communicating with another apparatus.

The following description relates to components included in the image forming apparatus 10.

The image forming apparatus 10 includes one or more hardware units having respective functions, a system controller 12, and a device controller 14. The system controller 12 corresponds to an example of a second controller, and the device controller 14 corresponds to an example of a first controller.

The system controller 12 and the device controller 14 are connected to each other by a general-purpose communication path and exchange various types of information with each other. For example, control information used for controlling hardware, status information indicating statuses of the respective controllers, and information indicating a detection result of a sensor may be exchanged between the system controller 12 and the device controller 14. The general-purpose communication path is, for example, a serial line. The serial line may be an existing interface, such as a universal asynchronous receiver/transmitter (UART) or I²C, if the serial line is not dependent on the configuration of the system controller 12 or the device controller 14, or may be a newly-defined interface. The system controller 12 and the device controller 14 may be connected to each other by, for example, a bus (e.g., a high-speed bus, such as Peripheral Component Interconnect (PCI) Express).

The image forming apparatus 10 includes, for example, a user interface (UI) unit 16, a communication unit 18, an input device 20, and an output device 22 as hardware units. The UI unit 16 includes a display unit and an operable unit. The display unit is a display device, such as a liquid crystal display. The operable unit is an input device, such as a touchscreen or a keyboard. The UI unit 16 may alternatively be a user interface (e.g., an operable panel) functioning both as a display unit and an operable unit. The communication unit 18 is a communication interface that has a function for transmitting data to another apparatus and a function for receiving data from another apparatus via a communication path, such as a network. The communication unit 18 may be a communication interface having a wireless communication function or may be a communication interface having a wired communication function. The input device 20 is, for example, a scanner and reads a document so as to generate image data expressing the document. The output device 22 is, for example, a printer and receives image data or document data so as to form an image or a document onto a recording medium, such as paper. The image forming apparatus 10 may additionally include a fan for cooling the interior of the image forming apparatus 10, a storage device, such as a hard disk or a memory, and so on.

The system controller 12 includes, for example, a controller 24, a register 26, and a storage unit 28 and has a function for performing processing not dependent on the hardware units included in the image forming apparatus 10, that is, a function for controlling common parts that are not dependent on, for example, types of hardware units, individual differences between the hardware units, and differences between products. For example, the system controller 12 performs display and input processes with respect to the UI unit 16 as a hardware unit, communication by the communication unit 18 (e.g., communication with an external apparatus via a communication path, such as a network), processing of image data and device information, image processing, user authentication, and memory management (e.g., reading from a secure digital (SD) card).

The controller 24 is constituted of, for example, a central processing unit (CPU) as an example of a processor. For example, the controller 24 controls the operation of the hardware by executing a software program. This software program is stored in, for example, the storage unit 28. The register 26 stores therein information used for controlling the hardware (such as a command or a parameter) as an example of information indicating the operational status of the hardware. The hardware operates in accordance with the information stored in the register 26. An address managed in accordance with an address signal is allocated to the register 26. The storage unit 28 is constituted of, for example, a memory and stores therein a register map. The register map is information having an address set therein, which is to be used when writing or reading data to or from the register 26. The controller 24 accesses the address of the register 26 mapped in the register map and controls the operation of the hardware in accordance with the information stored at the address of the access destination.

The device controller 14 includes, for example, a controller 30, a register 32, and a storage unit 34 and has a function for performing processing dependent on the hardware units included in the image forming apparatus 10, that is, a function for controlling parts unique to the hardware units. Specifically, the device controller 14 controls the input device 20, the output device 22, a fan, and a post-processing device, such as a stapler, and also controls, for example, a motor, a heater, and a lamp based on information obtained by various types of sensors.

The controller 30 is constituted of a circuit, such as an application specific integrated circuit (ASIC). The register 32 stores therein information used for controlling the hardware (such as a command or a parameter) as an example of information indicating the operational status of the hardware. The hardware operates in accordance with the information stored in the register 32. An address managed in accordance with an address signal is allocated to the register 32. The storage unit 34 is constituted of, for example, a memory and stores therein a register map. The register map is information having an address set therein, which is to be used when writing or reading data to or from the register 32. The controller 30 accesses the address of the register 32 mapped in the register map and controls the operation of the hardware in accordance with the information stored at the address of the access destination.

In this exemplary embodiment, a stylized register map, that is, a register map shared between the system controller 12 and the device controller 14, is used as the above-described register map. Specifically, the register map used in the system controller 12 (i.e., the register map stored in the storage unit 28) and the register map used in the device controller 14 (i.e., the register map stored in the storage unit 34) are maps having the same format.

Figure 2:
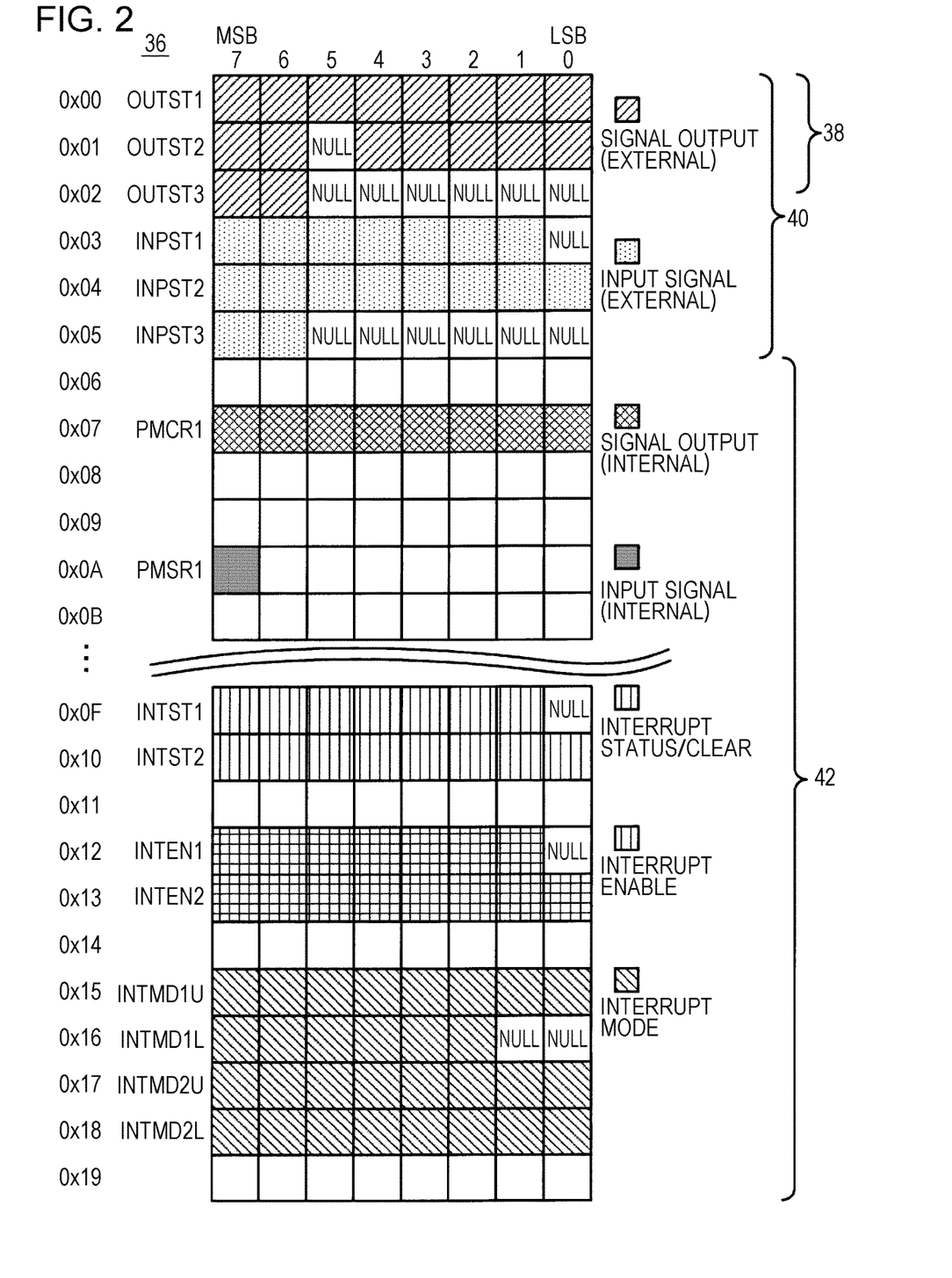
FIG. 2 illustrates an example of a register map.

The register maps will be described in detail below with reference to FIG. 2. FIG. 2 illustrates a register map 36. The register map 36 is a map indicating addresses of registers as storage destinations of information used for controlling the hardware (such as a command or a parameter), and indicates whether or not the information (such as a command or a parameter) is stored at each address. For example, a stored or non-stored state is set based on whether or not a flag is set. If the information is stored, a flag is set, whereas if the information is not stored, a flag is not set. The register map 36 includes, for example, register information indicating an address where information (such as a command or a parameter) related to a signal output to the outside (signal output (external)) is stored, register information indicating an address where information (such as a command or a parameter) related to an input signal from the outside (input signal (external)) is stored, register information indicating an address where information (such as a command or a parameter) related to an input signal from the inside (input signal (internal)) is stored, register information indicating an address where information (such as a command or a parameter) related to a status of interrupt processing (interrupt status/clear) is stored, register information indicating an address where information (such as a command or a parameter) related to enabling or disabling of interrupt processing or enabling or disabling of operation (interrupt enable) is stored, and register information indicating an address where information (such as a command or a parameter) related to an interrupt-processing mode is stored. The register map and the address information correspond to an example of control information.

The storage unit 28 of the system controller 12 and the storage unit 34 of the device controller 14 store therein register maps having the same format as the register map 36. Each of the system controller 12 and the device controller 14 transmits the register map stored therein to the counterpart controller by serial communication via the general-purpose communication path.

In the register map 36, a transmission interval is set for each piece of register information, and each of the system controller 12 and the device controller 14 transmits register information to the counterpart controller while varying the transmission interval in accordance with the type of register information (i.e., the type of information (such as a command or a parameter) for controlling the hardware). By transmitting the register information to the counterpart controller, the register information is synchronized between the system controller 12 and the device controller 14. By varying the transmission interval for each piece of register information, an increase in traffic in the general-purpose communication path may be suppressed, as compared with a case where each of the system controller 12 and the device controller 14 transmits all pieces of address information to the counterpart controller at the same timing. Moreover, since the system controller 12 and the device controller 14 do not have to be connected by multiple dedicated lines, the circuit configuration may be simplified, as compared with a case where multiple dedicated lines are used.

For example, a register information group 38 in the register map 36 includes register information of the highest priority level, a register information group 40 includes register information of an intermediate priority level, and a register information group 42 includes register information of the lowest priority level. The transmission interval is shorter for register information of higher priority levels. Thus, register information of a high priority level is synchronized more frequently between the system controller 12 and the device controller 14 (i.e., the time interval for the synchronization is shorter), as compared with register information of a low priority level. For example, the priority level is set in advance based on the level of necessity of immediacy at the counterpart controller (i.e., the level of necessity of real-time processing with the controller as the transmission source). Thus, register information with a high level of necessity of immediacy is given a high priority level. For example, in a case where the counterpart controller receives register information, the register information is given a high priority level if the register information corresponds to a short time period from the time point at which the counterpart controller receives the register information to the time point at which processing based on the register information is to be commenced. As a result, a short transmission interval is set for the register information. The priority level of each piece of register information is set in advance, and information indicating the priority level of each piece of register information is stored in advance in the storage units 28 and 34. A priority level may be linked with each piece of register information in the register maps. Accordingly, register information (i.e., information used for controlling the hardware) is classified in accordance with the transmission interval.

To describe the transmission interval from another viewpoint, the transmission interval of register information is set based on the position of the register information in the register map 36, that is, an address (corresponding to a storage region) where a command or a parameter is stored in the register. The position where the register information group 38 is disposed in the register map 36 is a position where the priority level is the highest, and register information disposed at that position is given the highest priority level. Likewise, the position where the register information group 40 is disposed in the register map 36 is a position where the priority level is about intermediate, and register information disposed at that position is given an intermediate priority level. Likewise, the position where the register information group 42 is disposed in the register map 36 is a position where the priority level is the lowest, and register information disposed at that position is given the lowest priority level.

The operation of the image forming apparatus 10 will be described below.

Figure 3:
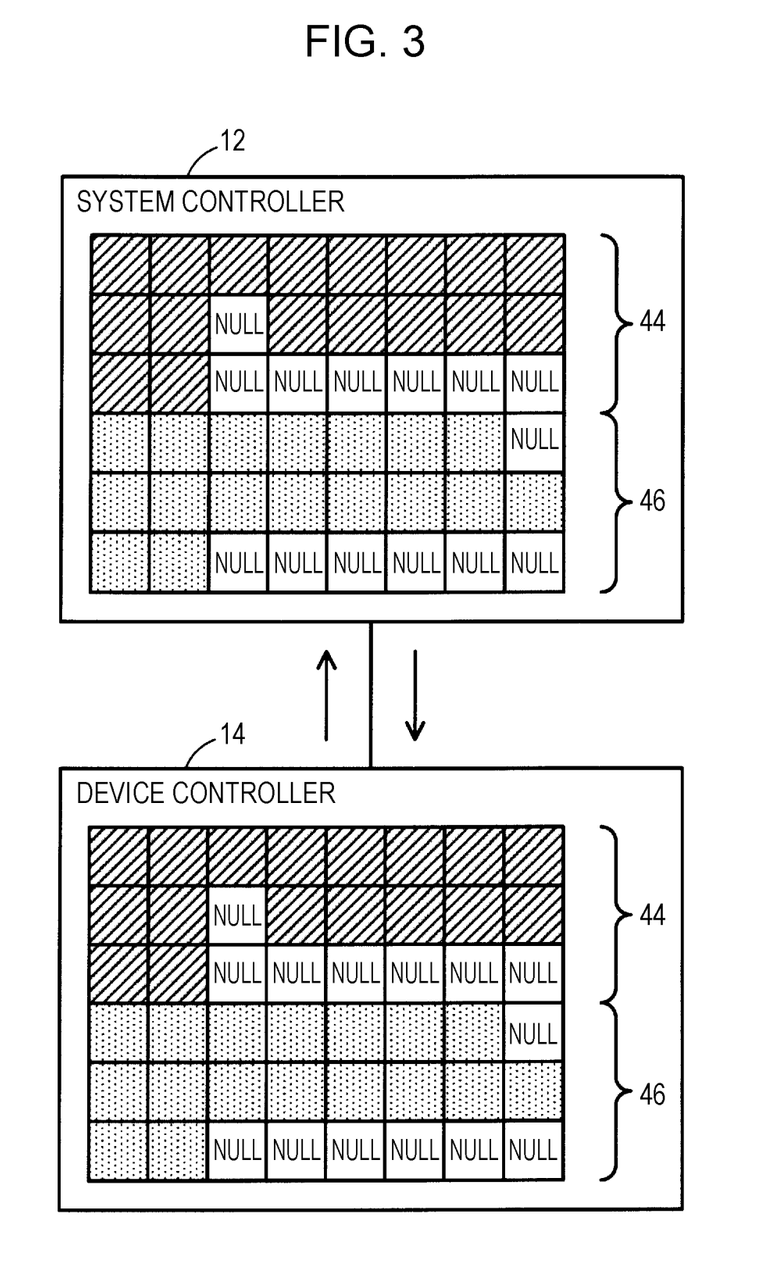
FIG. 3 illustrates exchanging of register information.

Exchanging of register information will now be described in detail with reference to FIG. 3. FIG. 3 illustrates register information to be exchanged. For example, the system controller 12 transmits register information 44 included in the register map stored in the storage unit 28 thereof to the device controller 14 via the general-purpose communication path. For example, the register information 44 is transmitted as packet information from the system controller 12 to the device controller 14 by serial communication. The register information 44 corresponds to register information indicating an address where information related to a signal output (external) in FIG. 2 is stored (specifically, "OUTST1", "OUTST2", and "OUTST3"). In the register map stored in the storage unit 34 of the device controller 14, register information corresponding to the register information 44 is updated to the register information 44 transmitted from the system controller 12.

Furthermore, the device controller 14 transmits register information 46 included in the register map stored in the storage unit 34 thereof to the system controller 12 via the general-purpose communication path. For example, the register information 46 is transmitted as packet information from the device controller 14 to the system controller 12 by serial communication. The register information 46 corresponds to register information indicating an address where information related to an input signal (external) in FIG. 2 is stored (specifically, "INPST1", "INPST2", and "INPST3"). In the register map stored in the storage unit 28 of the system controller 12, register information corresponding to the register information 46 is updated to the register information 46 transmitted from the device controller 14.

Since the register maps respectively included in the system controller 12 and the device controller 14 are maps having the same format, the register maps (i.e., register information) are synchronized as a result of exchanging the register information between the system controller 12 and the device controller 14, as described above. Moreover, since the register information as a map is exchanged between the system controller 12 and the device controller 14 by serial communication, it is not necessary to exchange information individually between the system controller 12 and the device controller 14 by providing a dedicated line for each command or each parameter. For example, since a dedicated line does not have to be provided for each of "OUTST1", "OUTST2", and "OUTST3" in FIG. 2, the circuit configuration is simplified.

Figure 4:
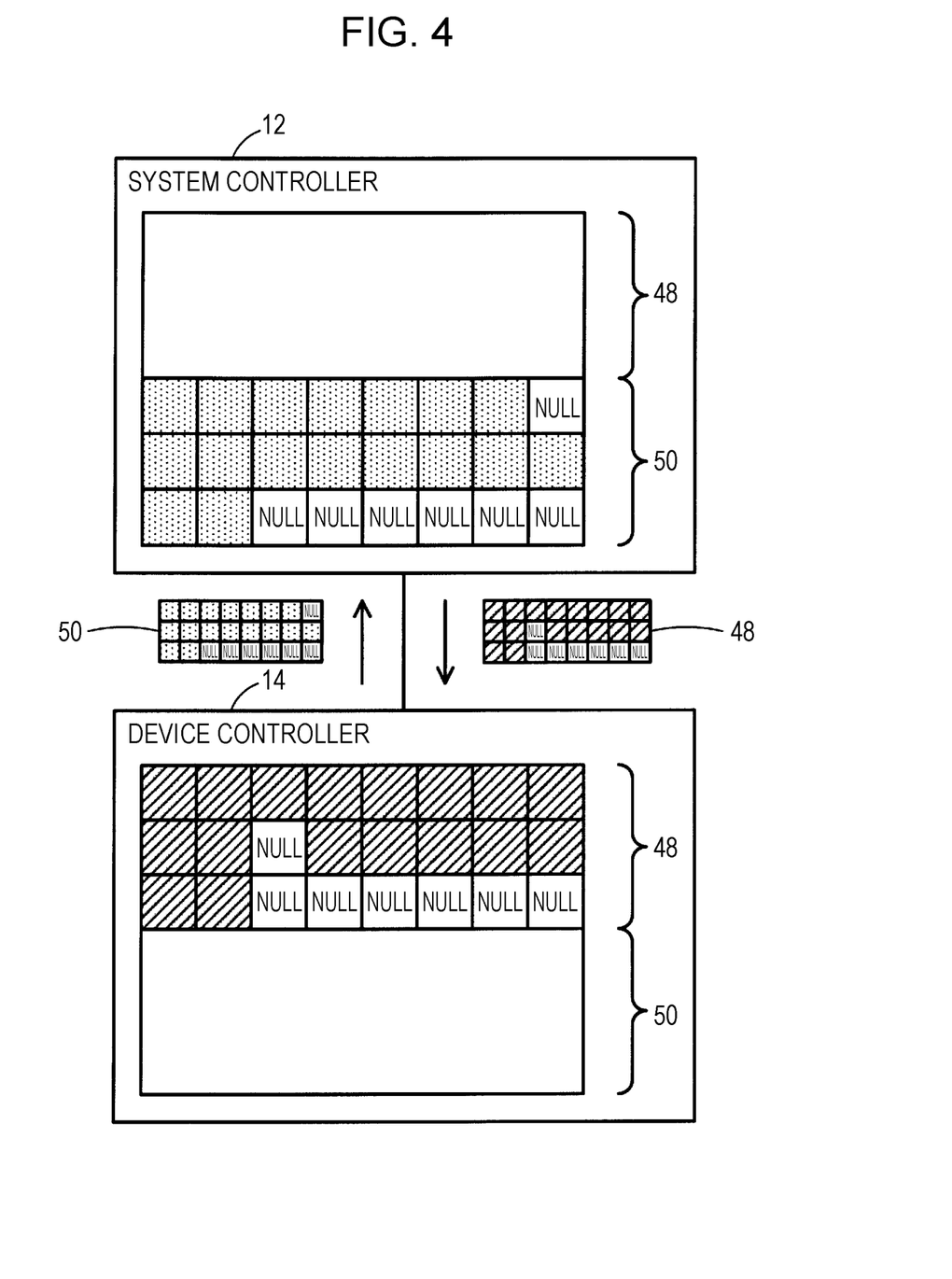
FIG. 4 illustrates exchanging of register information.

The following description with reference to FIG. 4 relates to exchanging of register information related to an initial value. FIG. 4 illustrates register information to be exchanged. For example, the system controller 12 transmits register information 48 included in the register map stored in the storage unit 28 thereof to the device controller 14 via the general-purpose communication path. The register information 48 indicates an initial value of hardware (e.g., a value indicating the operational status of the hardware at the time of activation of the image forming apparatus 10). In the register map stored in the storage unit 34 of the device controller 14, register information corresponding to the register information 48 is updated to the register information 48 transmitted from the system controller 12. For example, the register information 48 is an initial value of hardware controlled by the system controller 12.

Furthermore, the device controller 14 transmits register information 50 included in the register map stored in the storage unit 34 thereof to the system controller 12 via the general-purpose communication path. The register information 50 indicates an initial value of hardware. In the register map stored in the storage unit 28 of the system controller 12, register information corresponding to the register information 50 is updated to the register information 50 transmitted from the device controller 14. For example, the register information 50 is an initial value of hardware controlled by the device controller 14.

For example, when the power of the image forming apparatus 10 is turned on and a software program for controlling the hardware is being activated, the register information 48 and the register information 50 are exchanged between the system controller 12 and the device controller 14. Consequently, when the activation of the software program is completed, the initial value of the hardware is confirmed.

Figure 5:
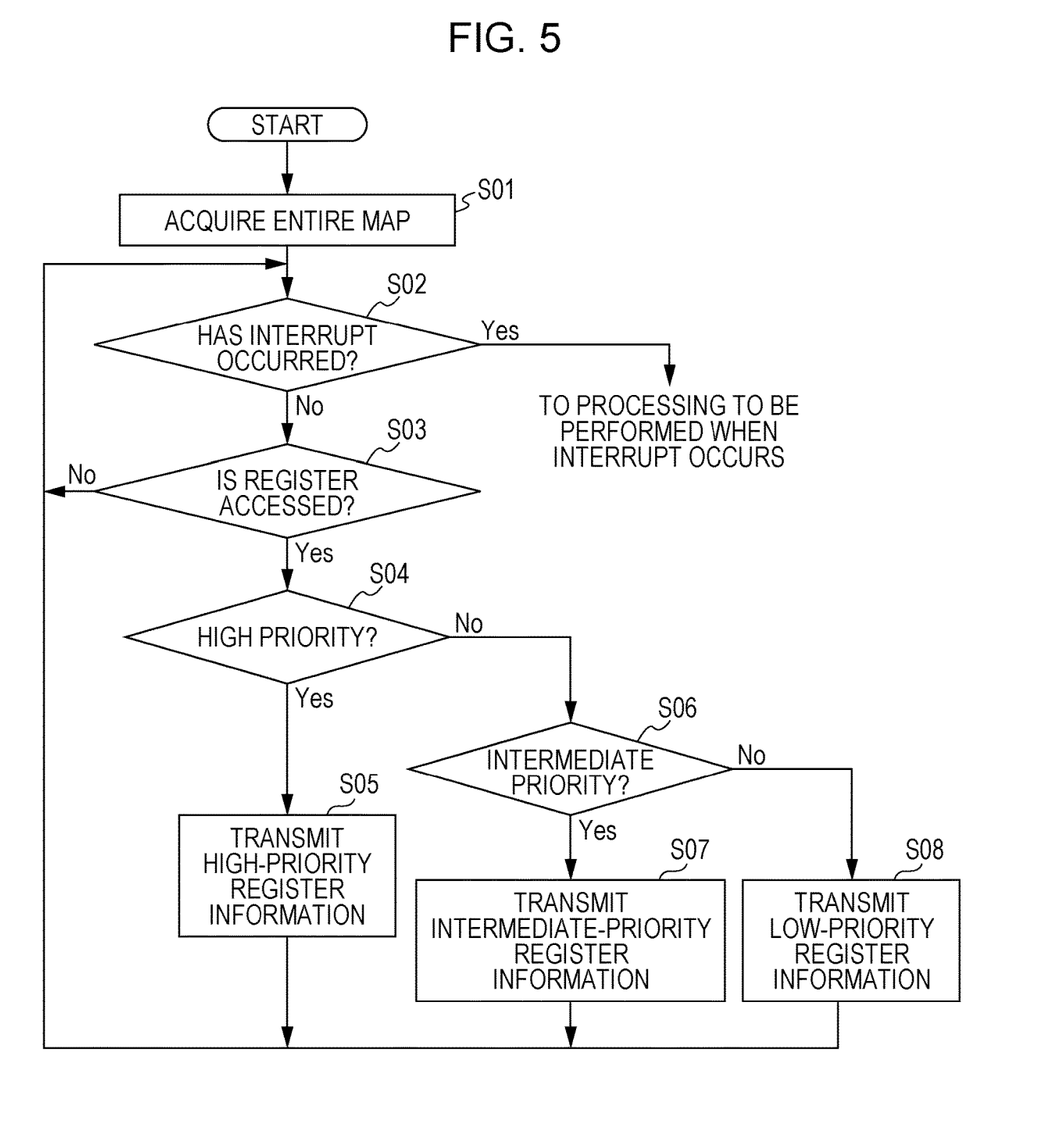
FIG. 5 is a flowchart illustrating exchanging operation according to a priority level.

The following description with reference to FIG. 5 relates to exchanging operation according to a priority level. FIG. 5 is a flowchart illustrating the operation. Although the operation in the device controller 14 will be described below, similar operation is also performed in the system controller 12.

First, the controller 30 of the device controller 14 acquires the entire register map in step S01 and subsequently switches to a standby mode. If interrupt processing occurs (Yes in step S02), the operation proceeds to processing to be performed when an interrupt occurs. If interrupt processing does not occur (No in step S02) and a factor for accessing the register 32 occurs (Yes in step S03), the priority level of the access is determined in step S04. If a factor for accessing the register 32 does not occur (No in step S03), the controller 30 switches to a standby mode.

If a high-priority factor occurs as a factor for accessing the register 32 (Yes in step S04), the controller 30 extracts high-priority register information included in the register map stored in the storage unit 34 and transmits the high-priority register information to the system controller 12 in step S05. Examples of a high-priority factor include system interrupt processing and recovery from an energy-saving mode, such as a sleep mode or a hibernation mode. The system controller 12 receives the high-priority register information included in the register map from the device controller 14. Consequently, in the register map stored in the storage unit 28 of the system controller 12, the high-priority register information is updated to the register information transmitted from the device controller 14. As a result, the high-priority register information is synchronized between the system controller 12 and the device controller 14.

If the factor for accessing the register 32 does not correspond to a high-priority factor (No in step S04) and the factor corresponds to an intermediate-priority factor (Yes in step S06), the controller 30 extracts intermediate-priority register information included in the register map stored in the storage unit 34 and transmits the intermediate-priority register information to the system controller 12 in step S07. Examples of an intermediate-priority factor include a case where no sheets are detected on a sheet tray (i.e., the sheet tray is empty), a case where a door of a housing of the image forming apparatus 10 is detected as being open, and a case where a specific status is detected with respect to an automatic document feeder or a post-processing device. The system controller 12 receives the intermediate-priority register information included in the register map from the device controller 14. Consequently, in the register map stored in the storage unit 28 of the system controller 12, the intermediate-priority register information is updated to the register information transmitted from the device controller 14. As a result, the intermediate-priority register information is synchronized between the system controller 12 and the device controller 14.

If the factor for accessing the register 32 does not correspond to an intermediate-priority factor (No in step S06), the controller 30 extracts low-priority register information included in the register map stored in the storage unit 34 and transmits the low-priority register information to the system controller 12 in step S08. Examples of a low-priority factor include a process for setting various types of initial values and a process for setting interrupt levels or modes. The system controller 12 receives the low-priority register information included in the register map from the device controller 14. Consequently, in the register map stored in the storage unit 28 of the system controller 12, the low-priority register information is updated to the register information transmitted from the device controller 14. As a result, the low-priority register information is synchronized between the system controller 12 and the device controller 14.

Accordingly, register information is transmitted in accordance with the priority level, so that the amount of traffic may be reduced, thereby suppressing an increase in traffic in the general-purpose communication path, as compared with a case where all pieces of register information are transmitted to the counterpart controller at the same timing.

Furthermore, the transmission interval for high-priority register information is shorter than the transmission interval for intermediate-priority register information, and the transmission interval for intermediate-priority register information is shorter than the transmission interval for low-priority register information. Thus, the time interval of synchronization between the system controller 12 and the device controller 14 is shorter for register information of higher priority levels (i.e., the register information is updated more frequently). Consequently, the amount of traffic may be reduced, thereby suppressing an increase in traffic in the general-purpose communication path, as compared with a case where all pieces of register information are transmitted to the counterpart controller at the same timing.

Figure 6:
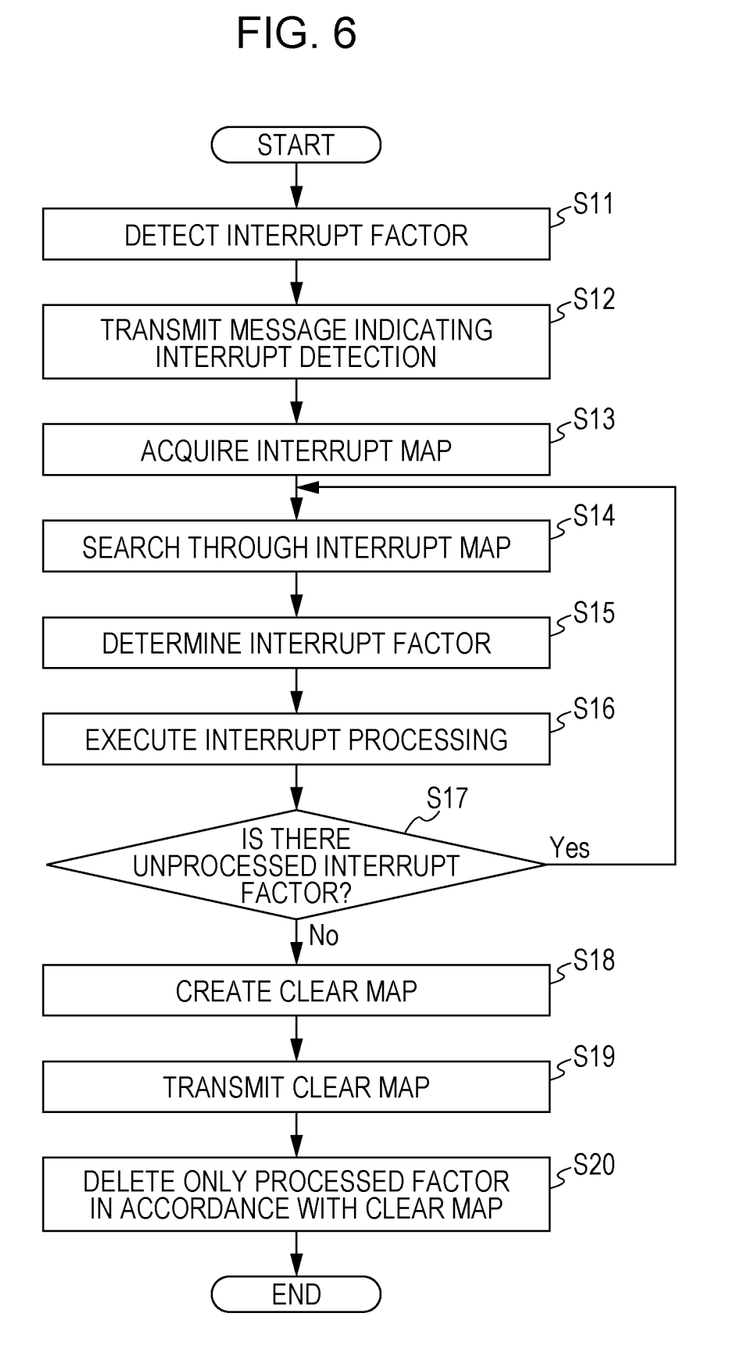
FIG. 6 is a flowchart illustrating operation performed when an interrupt occurs.

The following description with reference to FIG. 6 relates to operation performed when an interrupt occurs. FIG. 6 is a flowchart illustrating the operation. Although the following description relates to a case where an interrupt factor occurs in the device controller 14, similar operation is performed in a case where an interrupt factor occurs in the system controller 12.

First, in a case where an interrupt factor occurs in the device controller 14, register information related to interrupt processing therefor (e.g., an interrupt map) changes in the register map stored in the storage unit 34 of the device controller 14. Specifically, an interrupt-factor flag is set with respect to the register information related to the interrupt processing. In step S11, the controller 30 of the device controller 14 detects a change in the register map stored therein (e.g., the interrupt flag) so as to detect that an interrupt factor has occurred. In a case where the occurrence of an interrupt factor is detected, the device controller 14 transmits a message indicating the interrupt detection to the system controller 12 in step S12.

In step S13, the controller 24 of the system controller 12 receiving the message acquires, from the device controller 14, the interrupt map as the register information related to the interrupt factor. Then, the controller 24 of the system controller 12 searches through the interrupt map in step S14 so as to determine the interrupt factor in step S15. For example, the controller 24 compares the register map stored in the storage unit 28 thereof with the interrupt map transmitted from the device controller 14 so as to determine the interrupt factor expressed on the interrupt map.

In step S16, the system controller 12 executes processing related to the determined interrupt factor. For example, interrupt processing is executed by controlling the operation of each hardware unit in accordance with the interrupt factor. If there is an unprocessed interrupt factor (Yes in step S17), the operation returns to step S14 so that the process from step S14 and onward is executed.

If there is no unprocessed interrupt factor (No in step S17), the controller 24 of the system controller 12 creates a clear map for clearing (deleting) any interrupt flag provided in the register map in step S18. Specifically, the controller 24 sets a clear bit for clearing an interrupt flag with respect to register information provided with the interrupt flag in the register map. The clear map corresponds to an example of deletion information.

In step S19, the system controller 12 transmits, to the device controller 14, the clear map in which the clear bit is reflected.

In accordance with the clear map, the controller 30 of the device controller 14 clears (i.e., deletes) the interrupt flag from the register map stored in the storage unit 34 thereof in step S20. Since the clear map is effective only against the register information related to the interrupt factor, other factors are not cleared.

A detailed example of the operation when an interrupt occurs will be described below with reference to FIGS. 7 to 14. In the following description, it is assumed that an interrupt factor has occurred in the device controller 14.

Figure 7:
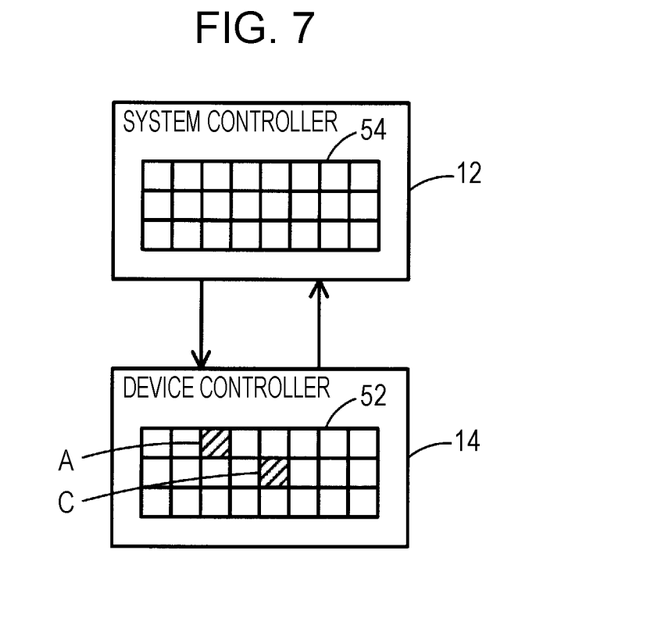
FIG. 7 illustrates the operation performed when the interrupt occurs.

FIG. 7 illustrates maps 52 and 54 included in the register map. The map 52 is stored in the storage unit 34 of the device controller 14, whereas the map 54 is stored in the storage unit 28 of the system controller 12. The map 54 is register information corresponding to the map 52. In a case where the maps 52 and 54 are synchronized with each other, the maps 52 and 54 contain the same information.

As shown in FIG. 7, in a case where factors A and C occur as interrupt factors in the device controller 14, interrupt flags are set in the map 52 (which is a part of the overall register map) as register information related to the factors A and C. The controller 30 of the device controller 14 detects the interrupt flags with respect to the factors A and C. Thus, the occurrence of the interrupt factors is detected. Accordingly, when an interrupt factor occurs in one of the controllers, a mismatch in the register maps occurs between the system controller 12 and the device controller 14.

Figure 8:
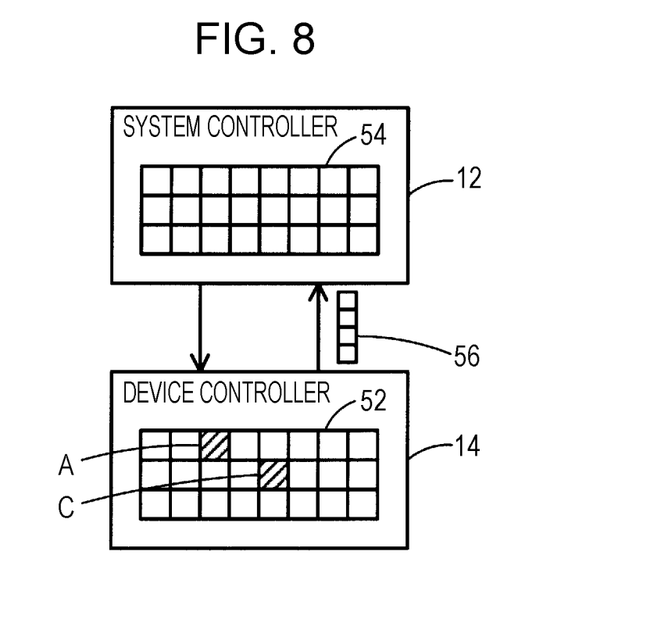
FIG. 8 illustrates the operation performed when the interrupt occurs.

When the occurrence of the interrupt factors is detected, the device controller 14 transmits a message 56 indicating the interrupt detection to the system controller 12, as shown in FIG. 8.

Figure 9:
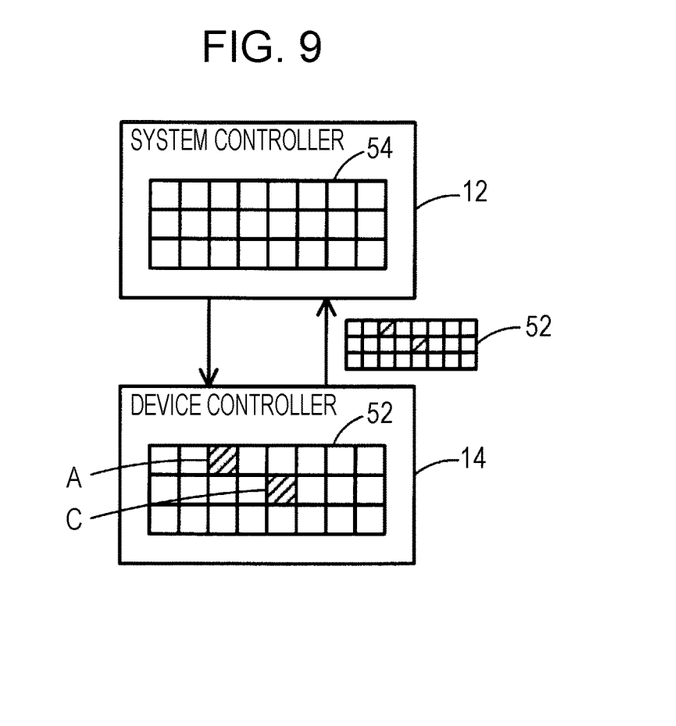
FIG. 9 illustrates the operation performed when the interrupt occurs.
Figure 10:
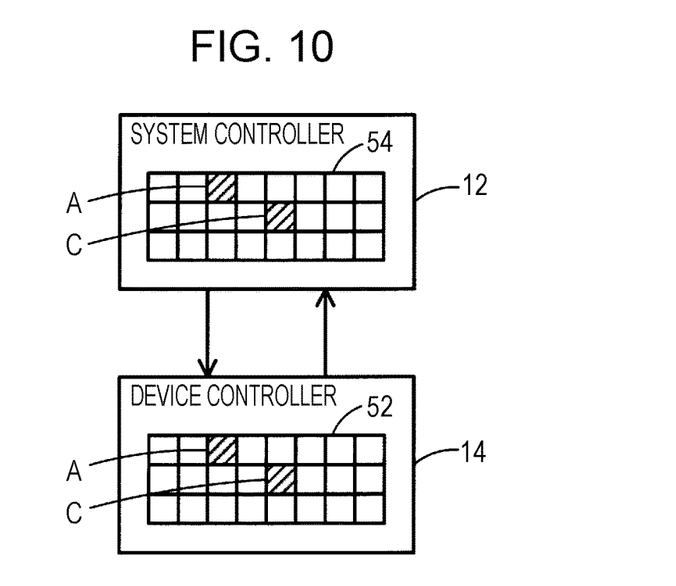
FIG. 10 illustrates the operation performed when the interrupt occurs.

Subsequently, as shown in FIG. 9, the device controller 14 transmits the map 52 as register information related to the factors A and C to the system controller 12, and the system controller 12 acquires the map 52. Accordingly, as shown in FIG. 10, the map 54 in the register map stored in the storage unit 28 of the system controller 12 is updated in accordance with the map 52 transmitted from the device controller 14, and interrupt flags with respect to the factors A and C are set in the map 54. Accordingly, the maps 52 and 54 are synchronized with each other. Then, the controller 24 of the system controller 12 determines the interrupt factors A and C by searching through the map 54 in which the factors A and C are reflected, and executes processing related to the factors A and C. For example, interrupt processing is executed by controlling the operation of each hardware unit in accordance with the factors A and C.

Figure 11:
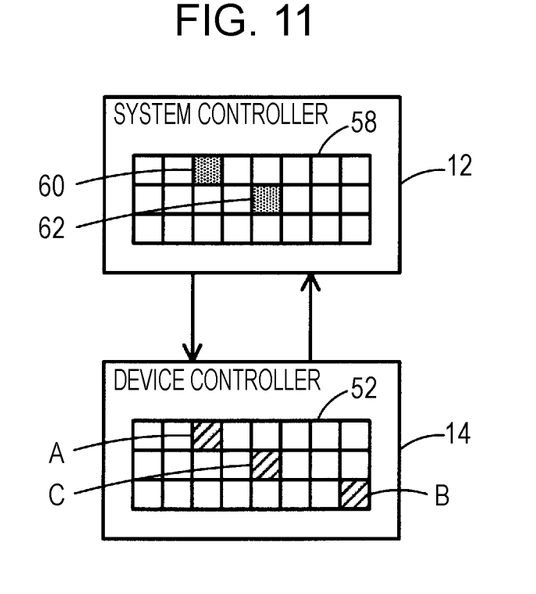
FIG. 11 illustrates the operation performed when the interrupt occurs.

When the processing related to the interrupt factors A and C is completed, the controller 24 of the system controller 12 creates a clear map 58 for clearing (deleting) any interrupt flag provided in the maps 52 and 54, as shown in FIG. 11. Specifically, the controller 24 sets clear bits 60 and 62 for clearing the interrupt flags with respect to the register information corresponding to the factors A and C and provided with the interrupt flags. The clear bit 60 corresponds to the factor A, whereas the clear bit 62 corresponds to the factor C. In the example shown in FIG. 11, a new interrupt factor B has occurred in the device controller 14, and an interrupt flag with respect to the interrupt factor B is set in the map 52.

Figure 12:
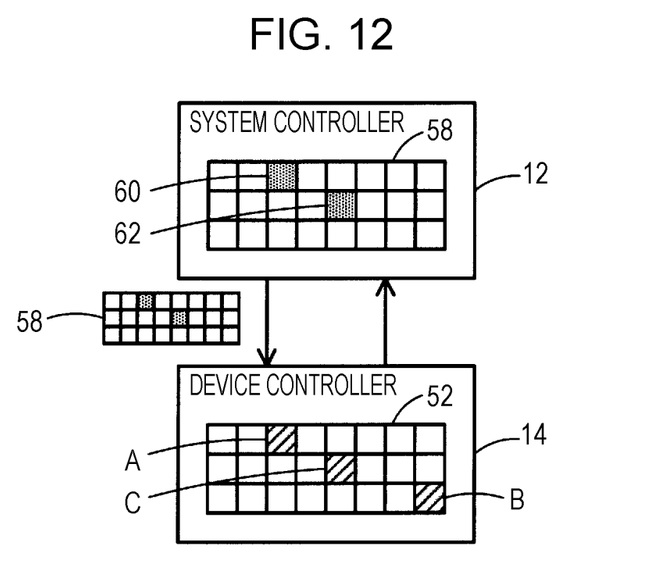
FIG. 12 illustrates the operation performed when the interrupt occurs.

As shown in FIG. 12, the system controller 12 transmits the clear map 58 to the device controller 14.

Figure 13:
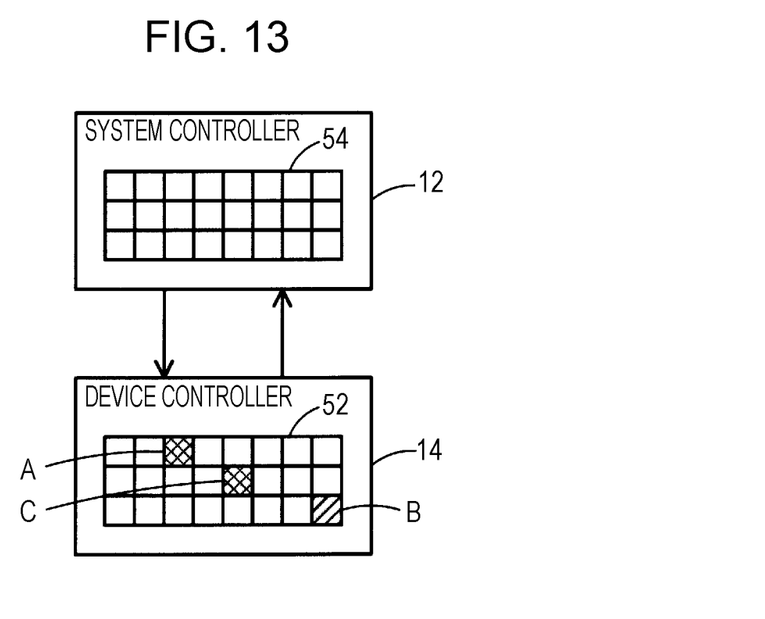
FIG. 13 illustrates the operation performed when the interrupt occurs.

As shown in FIG. 13, the controller 30 of the device controller 14 clears the interrupt flags of the factors A and C from the register map stored in the storage unit 34 thereof in accordance with the clear map 58. Since the cleat bit 60 is effective only against the factor A and the clear bit 62 is effective only against the factor C, the remaining factor B is not cleared by the clear map 58.

Figure 14:
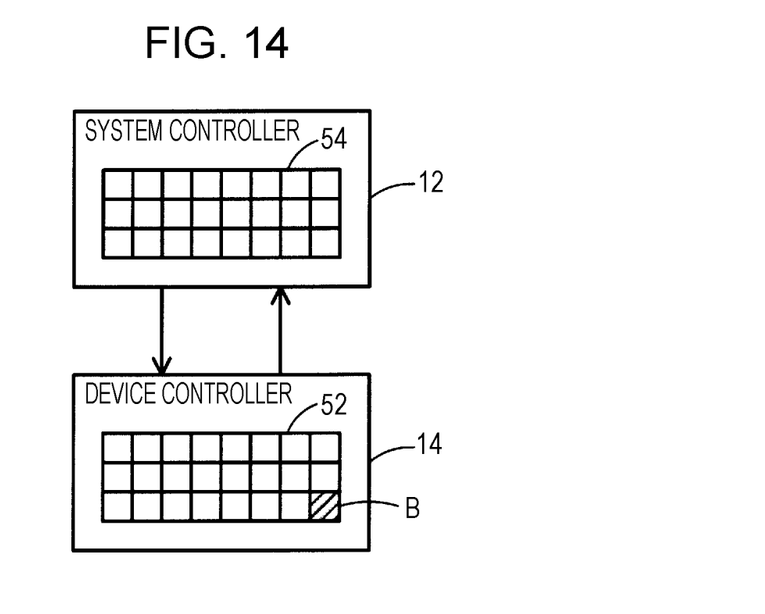
FIG. 14 illustrates the operation performed when the interrupt occurs.

FIG. 14 illustrates a state after the interrupt flags of the factors A and C have been cleared. The interrupt flags of the factors A and C are cleared from the map 52 stored in the device controller 14, such that an interrupt flag of the new factor B remains. Furthermore, the interrupt flags of the factors A and C are also cleared from the map 54 stored in the system controller 12, such that the map 52 expresses a state prior to the occurrence of the factors A and C.

Subsequently, the device controller 14 transmits a message indicating the detection of the new factor B to the system controller 12. The operation thereafter is the same as the above-described operation, and interrupt processing related to the factor B is executed.

In a case where an interrupt factor occurs as described above, the map related to the interrupt factor (i.e., register information) is synchronized between the system controller 12 and the device controller 14, so that a mismatch in the register maps is resolved and interrupt processing therefor is executed. When the interrupt processing is completed, only the interrupt factor for which the processing is completed is cleared from the register maps, so that an interrupt factor not processed yet is processed without being affected by the aforementioned clearing.

According to this exemplary embodiment, register information included in each register map is synchronized between the system controller 12 and the device controller 14 while varying the transmission interval in accordance with the type of information used for controlling hardware (such as a command or a parameter). Accordingly, the amount of traffic exchanged at one time may be reduced, thereby suppressing an increase in traffic, as compared with a case where all pieces of register information are exchanged between the system controller 12 and the device controller 14 at the same timing.

Furthermore, the system controller 12 and the device controller 14 are connected to each other by a serial line as an example of a general-purpose communication path, and the system controller 12 and the device controller 14 perform serial communication with each other. Accordingly, the interconnection between the system controller 12 and the device controller 14 may be simplified, as compared with a case where the system controller 12 and the device controller 14 are connected to each other by multiple dedicated lines (e.g., dedicated communication paths used for specific purposes).

Moreover, by using register maps having the same format in the system controller 12 and the device controller 14, synchronous processing not dependent on hardware is performed.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   a first controller that performs processing dependent on hardware having a function; and a second controller that is connected to the first controller via a general-purpose communication path and that performs processing not dependent on the hardware, wherein each of the first controller and the second controller transmits control information used for controlling the hardware to a counterpart controller of the first controller or the second controller via the communication path while a transmission interval is changed in accordance with a type of the control information.

2. The information processing apparatus according to claim 1, wherein the control information is classified in accordance with the transmission interval of the control information.

3. The information processing apparatus according to claim 2, wherein the control information contains an initial value of the hardware, and wherein each of the first controller and the second controller transmits the initial value to the counterpart controller when the apparatus is activated.

4. The information processing apparatus according to claim 2, wherein the transmission interval is shorter for the control information with a higher level of necessity of immediacy in the counterpart controller.

5. The information processing apparatus according to claim 2, wherein, in a case where the control information included in the first controller and the control information included in the second controller do not match due to occurrence of an interrupt processing factor, one of the first controller and the second controller in which the interrupt processing factor has occurred transmits the control information, which is included in the one controller and in which the interrupt processing factor is reflected, to the counterpart controller, so that the control information included in the counterpart controller is updated.

6. The information processing apparatus according to claim 1, wherein each of the first controller and the second controller has a memory that stores the control information, and transmits the control information to the counterpart controller while varying the transmission interval in accordance with a storage region of the memory in which the control information is stored.

7. The information processing apparatus according to claim 6, wherein the control information contains an initial value of the hardware, and wherein each of the first controller and the second controller transmits the initial value to the counterpart controller when the apparatus is activated.

8. The information processing apparatus according to claim 6, wherein the transmission interval is shorter for the control information with a higher level of necessity of immediacy in the counterpart controller.

9. The information processing apparatus according to claim 6, wherein, in a case where the control information included in the first controller and the control information included in the second controller do not match due to occurrence of an interrupt processing factor, one of the first controller and the second controller in which the interrupt processing factor has occurred transmits the control information, which is included in the one controller and in which the interrupt processing factor is reflected, to the counterpart controller, so that the control information included in the counterpart controller is updated.

10. The information processing apparatus according to claim 1, wherein the control information contains an initial value of the hardware, and wherein each of the first controller and the second controller transmits the initial value to the counterpart controller when the apparatus is activated.

11. The information processing apparatus according to claim 10, wherein the control information contains an initial value of the hardware, and wherein each of the first controller and the second controller transmits the initial value to the counterpart controller when the apparatus is activated.

12. The information processing apparatus according to claim 10, wherein the transmission interval is shorter for the control information with a higher level of necessity of immediacy in the counterpart controller.

13. The information processing apparatus according to claim 10, wherein, in a case where the control information included in the first controller and the control information included in the second controller do not match due to occurrence of an interrupt processing factor, one of the first controller and the second controller in which the interrupt processing factor has occurred transmits the control information, which is included in the one controller and in which the interrupt processing factor is reflected, to the counterpart controller, so that the control information included in the counterpart controller is updated.

14. The information processing apparatus according to claim 1, wherein the transmission interval is shorter for the control information with a higher level of necessity of immediacy in the counterpart controller.

15. The information processing apparatus according to claim 14, wherein, in a case where the control information included in the first controller and the control information included in the second controller do not match due to occurrence of an interrupt processing factor, one of the first controller and the second controller in which the interrupt processing factor has occurred transmits the control information, which is included in the one controller and in which the interrupt processing factor is reflected, to the counterpart controller, so that the control information included in the counterpart controller is updated.

16. The information processing apparatus according to claim 1, wherein, in a case where the control information included in the first controller and the control information included in the second controller do not match due to occurrence of an interrupt processing factor, one of the first controller and the second controller in which the interrupt processing factor has occurred transmits the control information, which is included in the one controller and in which the interrupt processing factor is reflected, to the counterpart controller, so that the control information included in the counterpart controller is updated.

17. The information processing apparatus according to claim 16, wherein, after interrupt processing is completed, the counterpart controller transmits deletion information for deleting the interrupt processing factor to the one controller in which the interrupt processing factor has occurred, so that reflection of the interrupt processing factor is deleted from the control information included in the one controller in which the interrupt processing factor has occurred.

18. An information processing apparatus comprising:
first controller for performing processing dependent on hardware having a function; and
second controller, connected to the first controller via a general-purpose communication path, for performing processing not dependent on the hardware,
wherein each of the first controller and the second controller transmits control information used for controlling the hardware to counterpart controller of the first controller or the second controller via the communication path while a transmission interval is changed in accordance with a type of the control information.

* * * * *